No. 699,662. Patented May 13, 1902.
L. C. COULTER.
PULLEY ATTACHMENT.
(Application filed Nov. 30, 1900.)

(No Model.)

Witnesses
F. E. Alden.
H. J. Shepard.

L. C. Coulter, Inventor.
by C. A. Snow & Co.
Attorneys

UNITED STATES PATENT OFFICE.

LEWIS C. COULTER, OF PORTLAND, OREGON.

PULLEY ATTACHMENT.

SPECIFICATION forming part of Letters Patent No. 699,662, dated May 13, 1902.

Application filed November 30, 1900. Serial No. 38,259. (No model.)

*To all whom it may concern:*

Be it known that I, LEWIS C. COULTER, a citizen of the United States, residing at Portland, in the county of Multnomah and State of Oregon, have invented a new and useful Pulley Attachment, of which the following is a specification.

This invention relates to pulleys, and has for its object to convert a grooved pulley into a flat-faced pulley for receiving a broad flat strap instead of the round strap that fits in the groove of the original pulley. It is especially designed to convert the grooved pulley of an ordinary sewing-machine, turning-lathe, or other foot-operated machine into a flat-faced pulley, in order that the machine may be driven by a flat belt from a counter-shaft and also to permit of the attachment being removed whenever it is desired to resume the foot-power and the round drive-strap.

With these and other objects in view the present invention consists in the combination and arrangement of parts, as will be hereinafter more fully described, shown in the accompanying drawings, and particularly pointed out in the appended claim, it being understood that changes in the form, proportion, size, and minor details may be made within the scope of the claim without departing from the spirit or sacrificing any of the advantages of the invention.

Figure 1:
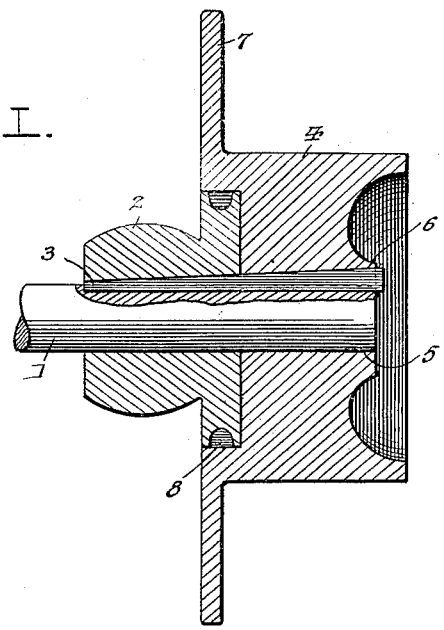
Figure 2:
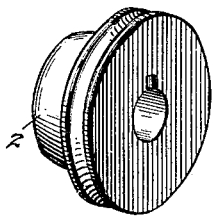
Figure 3:
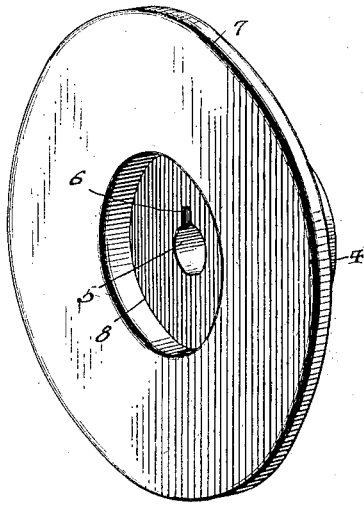

In the drawings, Figure 1 is a longitudinal sectional view of a grooved pulley provided with the present attachment. Fig. 2 is a perspective view of the original grooved pulley. Fig. 3 is a detail perspective view of the attachment.

Like characters of reference designate corresponding parts in all of the figures of the drawings.

Referring to the drawings, 1 designates the shaft of any ordinary sewing-machine, turning-lathe, or other foot-operated machine, having a grooved pulley 2, held thereon by means of a key 3 or other suitable means. Ordinarily the grooved periphery of such pulleys is comparatively narrow, and a flat strap would slip laterally therefrom, and in order to overcome this difficulty when it is desired to drive the machine by other power than the feet I have provided an attachment in the form of a broad pulley 4, having a central shaft-opening 5 and a keyway 6. At the inner edge of this supplemental pulley there is provided an outwardly-directed marginal flange 7, and in this flanged end of the pulley there is provided a circular recess or socket 8.

In applying the attachment or supplemental pulley to the grooved pulley, as best shown in Fig. 1 of the drawings, the key is detached from engagement with the shaft and the grooved pulley, and the supplemental pulley is slipped over the outer end of the shaft, so as to receive the grooved periphery of the latter pulley snugly within the recess or socket 8, after which a suitable key 3 is driven into corresponding keyways in the shaft and the supplemental pulley. This key may be the same as used for the grooved pulley, as shown in the drawings, or if the grooved pulley is otherwise secured to the shaft a separate key will then be used for the supplemental pulley.

The essential object of the present invention is to provide an attachment for covering the grooved portion of the small grooved pulley of a sewing-machine, the attachment being designed to remain upon the machine, so that it may be driven by a flat belt from a counter-shaft, although it is possible to remove the attachment by withdrawing the key should it be desired to again operate the machine by foot. When the attachment is in use, it is interlocked with the grooved pulley for simultaneous rotation therewith by means of the key, and when not in use said attachment is entirely removed from the shaft.

What is claimed is—

A shaft provided with a keyway, a grooved pulley on the shaft, a removable and replaceable supplemental flat-faced pulley provided with a recess to receive and cover the grooved portion of the first-named pulley, and a key to engage the keyway and to hold both pulleys on the shaft, substantially as and for the purpose specified.

In testimony that I claim the foregoing as my own I have hereto affixed my signature in the presence of two witnesses.

LEWIS C. COULTER.

Witnesses:
J. J. CLELAND,
E. G. SEAMAN.